United States Patent [19]

Barefoot

[11] Patent Number: 4,953,425
[45] Date of Patent: Sep. 4, 1990

[54] BICYCLE PEDAL ATTACHMENT

[76] Inventor: Darek Barefoot, 2183 Tovar Ct., Grand Junction, Colo. 81503

[21] Appl. No.: 420,301

[22] Filed: Oct. 12, 1989

[51] Int. Cl.⁵ .............................................. G05G 1/14
[52] U.S. Cl. ...................................... 74/534.6; 74/534.4
[58] Field of Search ................ 37/131, 132; 74/594.6, 74/594.4

[56] References Cited

U.S. PATENT DOCUMENTS

| 559,952 | 5/1896 | Robertson | 74/594.6 |
| 638,649 | 12/1899 | Sieverkropp | 74/594.6 |
| 661,026 | 10/1900 | Kinley et al. | 74/594.6 |

FOREIGN PATENT DOCUMENTS

| 2247 | 12/1897 | Denmark | 74/594.6 |
| 2407121 | 5/1979 | France | 74/594.6 |
| 21735 | of 1904 | United Kingdom | 74/594.6 |
| 24100 | of 1907 | United Kingdom | 74/594.6 |
| 170790 | 11/1921 | United Kingdom | 74/594.6 |
| 485748 | 5/1938 | United Kingdom | 74/594.6 |

*Primary Examiner*—Vinh T. Luong

[57] ABSTRACT

A bicycle pedal attachment having an elongated strap that is diagonally arched and attached to the bicycle pedal such that the front end of the strap is secured adjacent the front inside edge of the pedal and the rear end of the strap is secured to the bicycle pedal adjacent its rear outside edge. The structure allows the bicyclist to insert his foot into the pedal attachment toe first and at a diagonal angle through the arched loop formed by the strap and then by pivoting his heel inwardly the foot of the bicyclist will be captured with tension applied to the front outside of the foot across the top of the foot and also to the inside of the foot.

3 Claims, 2 Drawing Sheets

BICYCLE PEDAL ATTACHMENT

BACKGROUND OF THE INVENTION

1. Field of Invention

This invention relates generally to devices which hold or maintain the position of a bicycle rider's foot on the pedal of the bicycle and which bind or attach the rider's shoe to the pedal.

2. Description of the Prior Art

Various forms of binding systems have been developed to hold the foot of the bicyclist onto the bicycle pedal. The simplest and most common device is the pedal toe clip (a curved projection attached to the front of the pedal which loops over the toe of the rider's shoe) combined with a toe strap (a strap of leather or other flexible material passing through an eyelet in the top of the toe clip and underneath or through the back of the pedal, encircling the rider's foot at the instep). This system has many disadvantages, among them difficulty in inserting the foot through the opening formed by the strap, and the need to reach down and tighten or loosen the strap by hand.

More sophisticated mechanical binding mechanisms have been incorporated into special pedals, requiring special shoes or shoe fittings. These systems have their own drawbacks, including high price, the need for special shoes, and the failure or impaired performance of mechanical catches and levers when infiltrated by dirt or mud.

The invention here detailed prevents the rider's foot from slipping off the pedal. It also allows the rider to grip the pedal with the foot so as to pull it upward, without mechanically binding the shoe to the pedal. At the same time, it permits the rider to remove his foot rapidly from the pedal. It is easily engaged by the foot and requires no hand operation for tightening, loosening, or releasing. It does not require the use of special shoes, or shoes with special fittinqs on the sole. The invention is not a new pedal as such, but rather an attachment which can be fitted to many or most currently existing pedals to improve their performance, especially for touring or casual bicycling or cycling offroad.

Other characteristics of this invention will become apparent hereinafter.

SUMMARY OF THE INVENTION

The invention consists of two main components:

a bracket, which attaches to the font of the pedal by means of screws and nuts and projects laterally outward, and which contains at its outer extremity a means for anchoring a strap;

a strap or flexible arch of resilent material, which may be anchored to the rear inside corner of the pedal with a screw and nut and which arches upward, forward, and outward, and is attached at its outer end to the anchoring means of the bracket.

By forming a diagonal arch over the pedal, the device affords a wider opening for inserting the riders foot, which can be cocked at an inward angle for easy entry onto the pedal. At the same time, the diagonal arch tends to snug or tighten when the rider's heel is rotated inward to straighten the foot. By further rotating the heel to the inside, the rider can increase the tightness of the arch strap both at the sides and over the top of the foot, with an application of leverage similar to that by which a tourniquet bandage is tightened or loosened. When the heel is rotated out again, the foot may be withdrawn to the rear and outside with ease.

The diagonal orientation of the arch strap sets it apart from conventional toe straps, which encircle the foot perpendicularly. The wide mouth of the arch obviates the need for hand loosening before entry or exit, and also allows the foot to be withdrawn at an angle to the outside for quick stabilization of the bicycle, rather than directly to the rear and then afterward to the outside as is dictated by the conventional strap design.

The arch strap is made of nylon/urethane laminate or similar material which, though flexible, has sufficient resilence to maintain its upright shape without the need for a toe clip or other supportive appliance.

More specific details of the construction of this invention will become apparent hereinafter.

BRIEF DESCRIPTION OF THE DRAWINGS

Please note all drawings are approx. ½ scale and are of right-hand parts where right or left orientation is applicable.

DESCRIPTION OF THE PERFERRED EMBODIMENT

Figure 1:
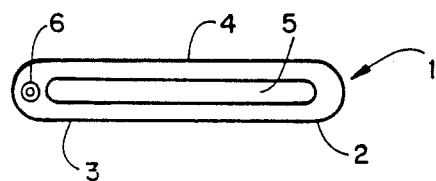
FIG. 1 is a plan view of the front bracket when not mounted to a pedal and FIG. 1a is a view of said bracket from below.

Please note that for purposes of orientation the terms or phrases "front," "forward," "forward of," etc. are used in the sense of the portion of a bicycle pedal or pedal attachment closest to the front of the bicycle. The terms "back," "rear," "behind," etc. are oriented in the opposite direction, toward the rear of the bicycle. The terms "inside," "inner," etc. refer to parts of the pedal or attachment located toward the bicycle, while "out," "outside," etc. refer to the direction away from the bicycle. The terms "up," "down," "above," "below," etc. are used in the conventional sense.

Where right- or left-hand orientation of parts is applicable, all parts described are right-hand examples.

Bicycle pedal 30 has a pedal body 32 having a plurality of outwardly extending legs 33–36. A spindle 38 that is externally threaded extends from the inner end of pedal body 32. A U-shaped cage 40 laterally surrounds pedal body 32 and has a front leg 42, a rear leg 44, and a cross member 46.

Figure 1A:

Referring to FIGS. 1 and 1a, the bracket 1 comprises: a round rod which is formed with U-shaped bends 2,3 and a continuous junction of the two ends of the rod 4 so as to form an elongated loop the inner opening of which 5 will accomodate screws for affixing said bracket to the front surface of a bicycle pedal, and a threaded stud 6 which is welded or otherwise affixed perpendicularly to the outer end of the bracket so as to provide a means of fastening a strap to the outer end of said bracket with a nut and washer.

Figure 2:
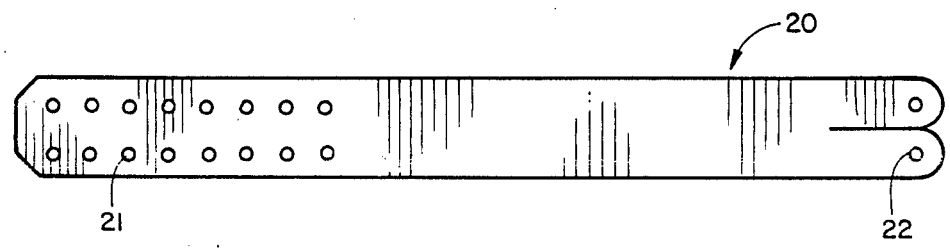
FIG. 2 is a plan view of the arch strap when not mounted to a pedal.

Referring to FIG. 2, the arch strap 20 comprises a continuous length of flexible material consisting of any polymeric/elastomeric laminate or material of similar flexibility, whether single layer or laminate, such as nylon, rubber, vinyl, leather, etc. Said strap contains holes (21) by means of which the front may be affixed at varying distances so as to accomodate different widths or sizes of riders' shoes and holes (22) by means of which the rearward end may be affixed.

Figure 3:
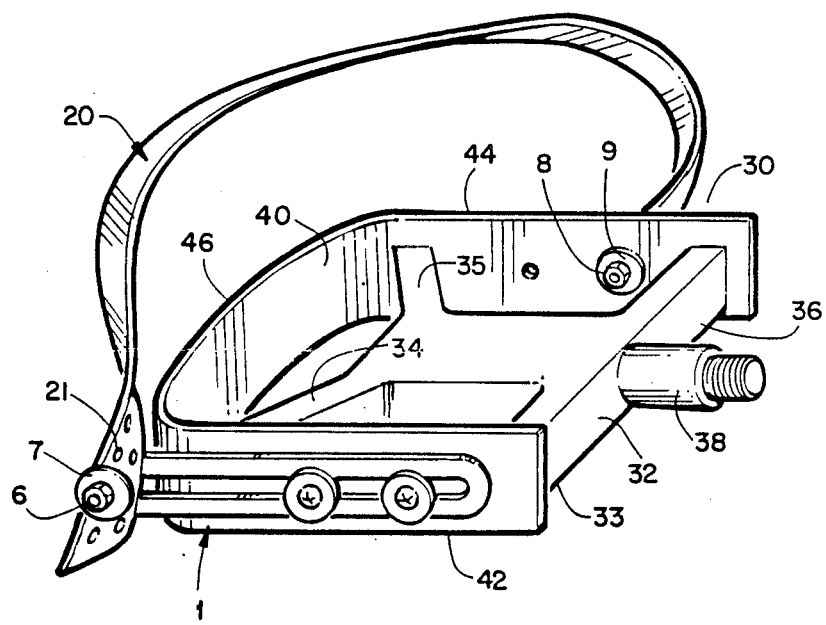
FIG. 3 is an oblique frontal view of the device mounted to a bicycle pedal.

Referring to FIG. 3, it can be seen that the bracket (1) is affixed by means of fasteners to the front leg of the pedal cage (42) so as to project laterally outward parallel to the front of the pedal cage to a point at or near the outward extremity of the pedal. At the outer end of the bracket the threaded stud (6) anchors the front end of the arch strap (20) which is pinched longitudinally and inserted onto the stud by means of the holes (21) in the front of the strap and secured by a washer and nut (7).

Still referring to FIG. 3, it can be seen that the arch strap projects up, over, and diagonally across the pedal, then down, and is affixed at its rearward end by means of a screw (8) inserted throught the holes in the rearward end of the strap and through a hole in the rear of the pedal cage (44) and secured with a nut and washer (9).

Figure 4:
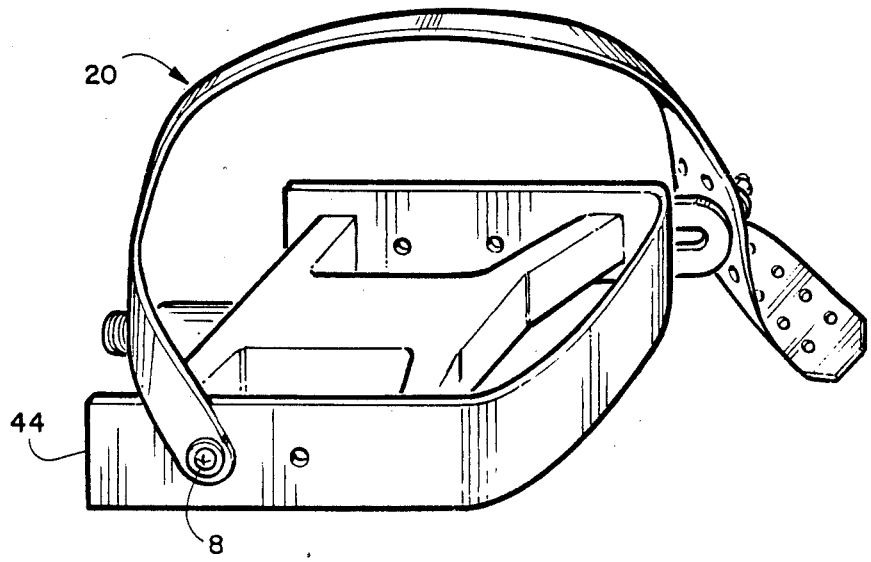
FIG. 4 is an oblique rear view of the device mounted to a bicycle pedal.

Referring to FIG. 4, it can be seen that the rear of the arch strap (20) is pinched longitudinally and secured through holes to the rear leg of the pedal cage (44).

Figure 5:
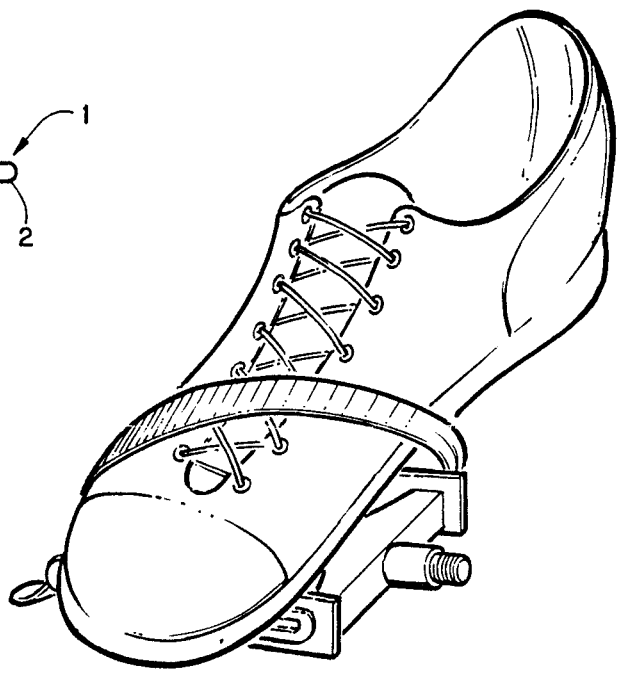
FIG. 5 is an oblique front view of the device mounted to a bicycle pedal and a shoe engaged therewith in the normal riding position.

Referring to FIG. 5, it can be seen that the device creates a arching support which serves to retain the foot of the rider on the pedal and provides a means of pulling the pedal upward.

Figure 6:
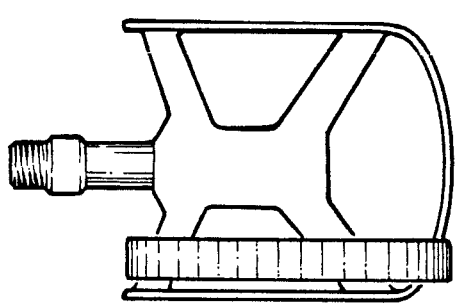
FIG. 6 is a plan view of a bicycle pedal with a silhouette superimposed thereon of the path of entry for a rider's shoe in the case of a conventional pedal toe strap.
Figure 6A:
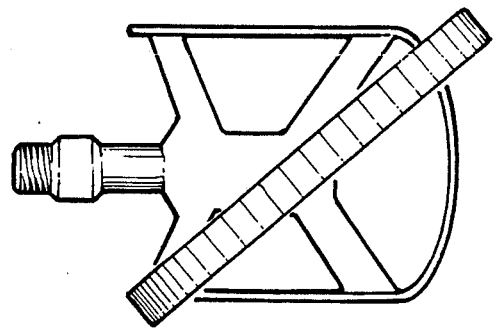
FIG. 6a is a plan view of a bicycle pedal with a sihouette of the relatively wider path of entry for a riders shoe in the case of the device here described.

Referring to FIGS. 6 and 6a, it can be seen that the configuration of a conventional pedal toe strap presents a relatively narrower opening, as illustrated in FIG. 6, through which the bicycle rider's foot must be inserted and withdrawn as compared with the opening afforded by this device as illustrated in FIG. 6a.

This invention is not limited to the embodiment described above, but includes any and all alternatives, equivalents, modifications and rearrangements of elements pertaining to this invention as set forward under "Claims", below.

What is claimed is:

1. The combination of a bicycle pedal and a foot attachment assembly comprising:

a bicycle pedal having a body having a front end, a rear end, an outer side and an inner side, said front end and said rear end being substantially parallel to each other, said outer side and said inner side being substantially parallel to each other;

a spindle extends transversely from said inner side and it is externally threaded;

a single elongated strap having a front end and a rear end;

means for detachably securing the front end of said strap to said bicycle pedal at a point adjacent the intersection of its front end and its outer side;

means for detachably securing the rear end of said strap to said bicycle pedal at a point adjacent the intersection of its rear end and its inner side; and the above structure forms a closed arched loop into which a bicyclist can first insert his foot from the outer side of the bicycle pedal and then by rotating his heel inwardly cause his foot to be captured for as long as desired wherein said means for detachably securing the front end of said strap comprises at least one aperture adjacent the front end of said strap, an elongated bracket having an inner end and an outer end, a stud means extends transversely from said outer end and through the aperture adjacent the front end of said strap.

2. The combination as recited in claim 1 wherein said elongated bracket has a longitudinally extending slot, at least one bolt passing through said slot and also through an aperture in the front end of the body of said pedal to secure the bracket to the body of said pedal.

3. The combination as recited in claim 1 wherein said means for detachably securing the rear end of said strap comprises at least one aperture adjacent the rear end of said strap, a bolt inserted into said aperture and also an aperture in the rear end of said pedal and a nut to secure the bolt in position.

* * * * *